United States Patent [19]

Sutter

[11] 4,285,552
[45] Aug. 25, 1981

[54] TORQUER APPARATUS FOR MAGNETICALLY SUSPENDED MEMBERS

[75] Inventor: Clair G. Sutter, Phoenix, Ariz.
[73] Assignee: Sperry Corporation, New York, N.Y.
[21] Appl. No.: 120,202
[22] Filed: Feb. 11, 1980
[51] Int. Cl.³ ............................................. F16C 39/06
[52] U.S. Cl. ..................................... 308/10; 74/5.46
[58] Field of Search ................. 308/10; 74/5.46, 5 E, 74/5.4

[56] References Cited

U.S. PATENT DOCUMENTS

| | | | |
|---|---|---|---|
| 3,845,995 | 11/1974 | Wehde | 308/10 |
| 4,043,614 | 8/1977 | Lyman | 308/10 |
| 4,077,678 | 3/1978 | Studer | 308/10 |
| 4,114,960 | 9/1978 | Habermann | 308/10 |
| 4,212,443 | 7/1980 | Duncan | 308/10 |
| 4,222,270 | 9/1980 | Allen | 308/10 |

Primary Examiner—R. Skudy
Attorney, Agent, or Firm—Howard P. Terry

[57] ABSTRACT

A magnetic suspension system is disclosed including a fixed member and a movable member, each of said members having magnetically permeable pole pieces defining a magnetically permeable gap therebetween and means for producing a suspending magnetic field across said gap. Apparatus for applying an electrically generated force between said members is provided which includes an electrical coil mounted on one of the pole pieces and in the gap and having at least a portion of the conductors thereof oriented at right angles to the magnetic flux fields in the gap, and means for supplying a current through the coil means thereby to distort said magnetic suspension flux field in the gap whereby said other pole piece in tending to follow the flux field produces a force on the suspended member proportional to the coil current.

5 Claims, 8 Drawing Figures

TORQUER APPARATUS FOR MAGNETICALLY SUSPENDED MEMBERS

CROSS REFERENCE TO RELATED APPLICATION

The present application is related to the co-pending U.S. patent application Ser. No. 120,203, filed concurrently herewith on Feb. 11, 1980 in the name of James R. Dohogne, entitled "Magnetically Suspended Free Rotor Gyroscope," and assigned to Sperry Corporation. The present invention will be described herein in its application in magnetically suspended free-rotor gyroscopic sensors such as described in the Dohogne application.

BACKGROUND OF THE INVENTION

1. Field of the Invention

The present invention relates generally to apparatus for applying control forces to magnetically suspended members and torques about the suspension axes of magnetically suspended members. It will be understood that, in its broad aspects, the invention is useful in applying forces or torques to any magnetically suspended member such as, for example, in a precision pointing system wherein the pointed element, such as a space telescope, is supported in a platform, coarsely supported and positioned by electromechanical actuators and finely supported and positioned by a magnetic suspension. Also, the invention finds use in magnetically suspended, high speed scanners wherein it is desired to apply small angular or lineal forces or angular torques for fine focusing or scanning purposes.

2. Description of the Prior Art

All magnetic suspensions include some form of magnetically permeable gaps between the fixed member and the suspended member and the generation of strong magnetic fields across these gaps to provide the suspending forces. The configurations of the gap-forming structures may take many forms. The magnetic fields may be produced by wholly active means, that is, generated by electromagnetic fields only, or they may be a combination of permanent magnet fields (passive fields) and electromagnetic fields (active fields). Typical structures utilizing the latter types of magnetic suspensions are disclosed in the A. V. Sabnis U.S. Pat. No. 3,976,336 for a "Magnetic Suspension Apparatus," issued Aug. 24, 1976 and in the J. R. Dohogne, A. V. Sabnis U.S. Pat. No. 4,090,745 for a "Magnetic Suspension Apparatus with Magnetic Stiffness Augmentation," issued May 23, 1978, both assigned to Sperry Corporation. Both of the latter patents and the Studer U.S. Pat. No. 4,000,925 disclose magnetic suspensions for suspending gyroscopic rotors.

Another form of a magnetically suspended gyroscopic device is the magnetically suspended, free-rotor torque feed back gyroscopic rate sensor of the above referenced copending J. R. Dohogne application. This device is typical of force or torque feed back rate sensors wherein the rotor is maintained in a substantially zero deflected position relative to its supporting housing by feeding back currents to torque motors which apply torques on the rotor to oppose any rotor tilt, such currents being proportional to the tilt-causing force, for example, the angular rate of the vehicle on which the sensor is mounted. The present invention is particularly applicable to such sensors and will be described in connection therewith.

Typical prior art torquing or positioning of magnetically suspended members involved, for example, increasing and decreasing the primary magnetic suspension fields in solenoid fashion. This is particularly applicable to the all-active types of magnetic suspensions. In other cases, the application of torques or forces on the magnetically suspended member which includes active and passive types of suspensions, involved exerting such torques or forces on elements of the member completely independently of the magnetic suspension field itself. Such schemes require the direct modulation of the primary source of the magnetic suspension field; i.e., the variation of the current supplied to the coils of the field generators or completely separate and integral torque motors or force generators acting independently of the magnetic suspension, resulting in design complexity and increased weight and cost.

SUMMARY OF THE INVENTION

The torquer or force generator for magnetically suspended members of the present invention beneficially utilizes the existing magnetic suspension field existing in the gaps between the suspending and the suspended members. It is particularly advantageous in suspensions wherein the gaps are quite small and are maintained quite small during operation. According to the invention, electric coils are secured preferably to the fixed or stationary gap-defining poles of the suspension. When an electric current is supplied to the coils, the electromagnetic fields produced about the coils by the electric current circulating therein interacts with the suspension magnetic field to distort the latter in a direction corresponding to and in an amount proportional to the coil current. This distortion of the suspension magnetic field causes the facing poles of the suspended member to attempt to become aligned therewith and, in so doing, imparts a corresponding force on the suspended member.

DESCRIPTION OF THE PREFERRED EMBODIMENTS

In strapped down inertial reference system employing precision rate of turn measuring gyroscopes, it is important that support elements for the spinning gyro rotor exert no coercive torques upon the rotor over its operating range. This is achieved by making the effective suspension elements have substantially zero restoring stiffness to disturbing angular rates. The instantaneous angular position of the momentum vector of the spinning rotor is then readily controlled through the use of a feed back loop including pick-off elements, amplifiers, and electrical torquers, the angular displacement of the vector with respect to the rotor casing being kept very small, so that the restoring torque currents provide measures of the rates of turning of the craft-mounted instrument casing. Such desirable free-rotor characteristics are achieved using a magnetically supported free gyroscope rotor that normally never contacts stationary parts of the instrument. The rotor-magnetic suspension combination is selected to provide the desired neutral or zero angular stiffness with respect to any angular case motion caused by a corresponding angular motion of the craft to which the case is strapped. The result is accomplished by a geometric design having a predetermined relation involving the axial distance or span between the spaced flux gaps and the mean effective radius of the flux gaps. All of the foregoing is disclosed in detail in the aforementioned copending Dohogne application.

Figure 1:
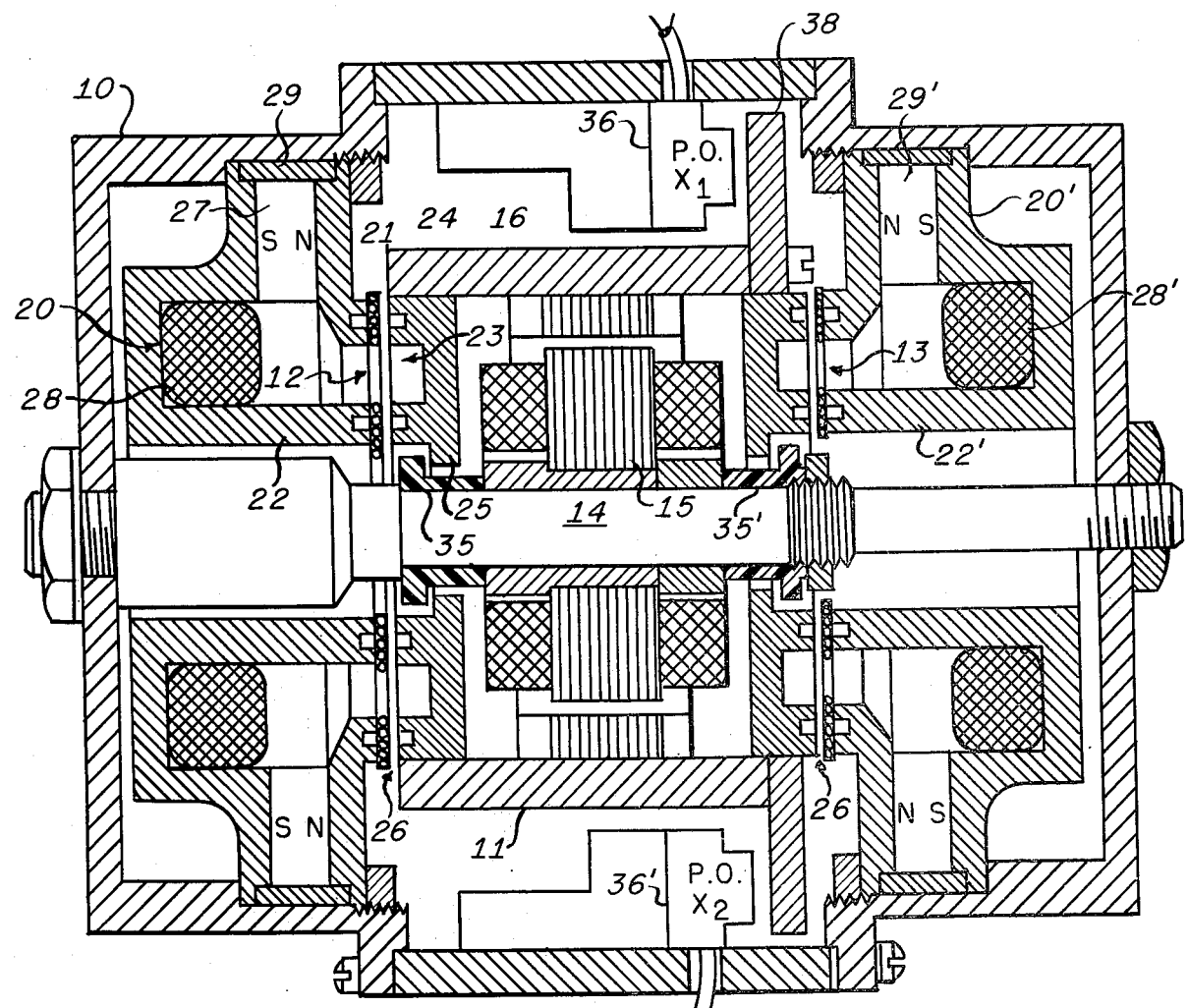
FIG. 1 is a detailed cross section view of a preferred embodiment of the present invention as applied in a force feed back rate sensor.

Referring now to FIG. 1, there is illustrated in cross-section a magnetically suspended gyroscopic force or torque balanced rate sensor incorporating the torquer apparatus of the present invention, the magnetic suspension of this configuration being of the radially passive, axially active type. The basic elements of the sensor comprise a cylindrical housing or casing 10 adapted to be strapped down to a vehicle or craft, a rotor 11 magnetically suspended by annular magnetic suspensions 12 and 13 to spin about a spin axis and to tilt about orthogonal tilt axes Y and Z in response to craft and hence housing motion or tilt about these axes. Cylindrical housing 10 includes a central tie-rod 14 serving to support centrally and fixedly thereof an electric motor stator and stator winding 15 which cooperates with motor rotor stack 16 fixed to gyro rotor 11 for spinning gyro rotor 11 about spin axis X.

Each of the magnetic suspensions 12 and 13 is identical and, therefore, only suspension 12 need be described in detail, the corresponding reference characters for corresponding elements or suspension 13 being primed. Suspension 12 comprises a soft iron core 20 of an annular, generally U-shaped cross-section, the horizontally or axially extending open ends thereof constituting radially spaced magnetizable poles 21 and 22. Secured on the end of rotor 11 is a corresponding soft iron core 23 of an annular, generally U-shaped cross section, the horizontally or axially extending open ends thereof constituting magnetizable poles 24, 25 and providing a return path for the magnetic flux. Core pieces 20 and 23 are dimensioned so as normally to face each other and to define a pair of radially spaced annular magnetic gaps 26. Preferably, each pole face is provided with annular grooves which define sharp flux-concentrating ridges to enhance the radial stiffness of the suspension, as taught in the Sabnis patent. Also as taught by Sabnis, the core assembly 20 includes means for producing passive and active magnetic fluxes across gap 26, such means including annular permanent magnet 27 located in one of the arms thereof, preferably of the samarium cobalt type, and an annular electrical coil 28 located in the base of the U-shaped core 20. Permanent magnets 27, 27' are polarized in an axial direction as shown and are so poled that the fluxes in gaps 26, 26' oppose each other. Core members 20, 20' are secured in housing 10 by suitable casing shoulders and ring-screw clamps, as shown. Also, since samarium cobalt magnetic material tends to be quite fragile, soft iron spacers 29, 29' are provided to protect magnets 27, 27' from the clamping forces. It will also be noted that gaps 26, 26' may be precisely determined by accurately machining the length of the cylindrical housing 20. The entire assembly is secured together by means of tie-rod 14 and securing nuts 31.

Permanent magnets 27, 27' generate a permanent or passive magnetic flux in opposite directions across gaps 26, 26' between pole pieces 21, 22 and 21', 22'. If the rotor is exactly equally spaced between the fixed poles 21, 22, 21', 22', the opposed passive fluxes in gaps 26, 26' cause rotor 11 to be in a state of unstable equilibrium in the axial direction and in a state of stable equilibrium in the radial direction. The slightest axial disturbing motion of the rotor will cause it to accelerate axially toward one pole face or the other depending on the direction of the axial disturbing force. Suitable stops 35 between rotor 11 and fixed shaft 14 are dimensioned to prevent the pole faces from actually contacting each other under this hard-over condition so that the axially stabilization electromagnetic flux, now to be described, may be effective. Additionally, stops 35, 35' may be constructed of a material having the properties of a tetrafluoroethylene fluorocarbon polymer of the kind found in the market under the trademark "Teflon," so as to serve as a touch-down bearing for rotor 11.

The electric coils 28, 28', when properly energized, produce an active or electromagnetic flux across gaps 26, 26' to stabilize rotor 11 axially and centrally between poles 21, 22 and 21', 22', again as taught by Sabnis. This active magnetic flux is produced by a closed-loop velocity servo system. For this purpose, means are provided for generating an electrical signal proportioned to any force producing a change in the axial position of rotor 11 from its unstable equilibrium position, which signal is processed and amplified by suitable controls as will be described, and then fed to coils 28, 28' so as to generate an axially passive flux to oppose such disturbing force and to move the rotor back to its unstable equilibrium position, reducing the signal to zero. In the embodiment of FIG. 1, the signal generator means comprises two pairs of diametrically opposed proximeter sensors 36, 36' secured to housing 10 and generally in the X-Z plane and 37, 37' (not shown in FIG. 1), also secured to housing 10 in the X-Z plane. These pick-offs cooperate with annular flange 38 of rotor 11. Thus, axial motion of rotor 11 causes corresponding signals to be generated by all the pick-offs proportional thereto which will, through the control circuit and coils 28, 28', produce the aforementioned stabilizing passive flux.

Figure 3:
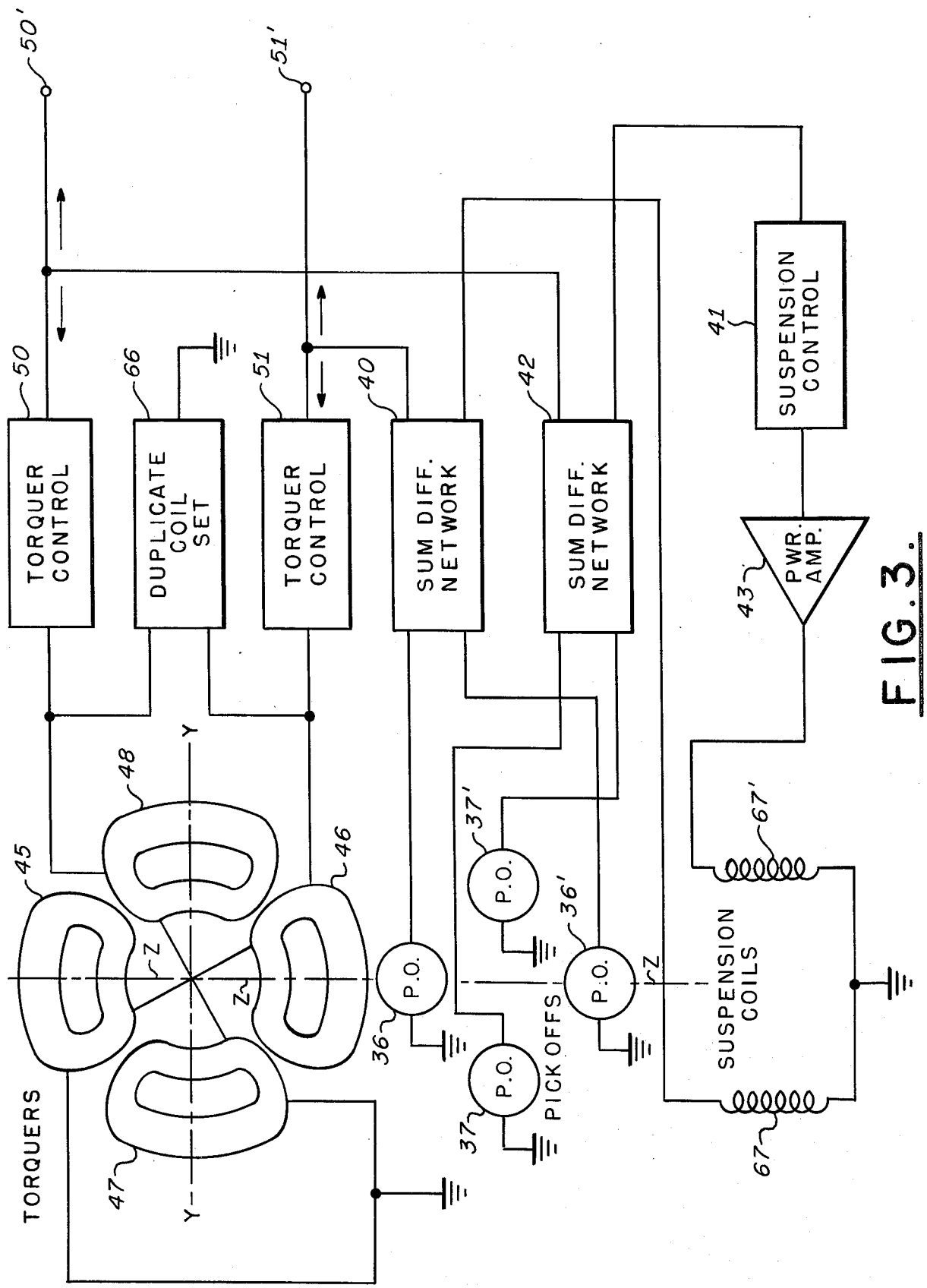
FIG. 3 is an electrical schematic diagram of a suitable control system for the torquer of FIGS. 2A and 2B.

A suitable electrical control for providing the signal shaping and amplification is shown in FIG. 3, wherein the output of the pick-offs 36, 36' is supplied to a sum and difference network 40, the sum output of which is supplied to suspension control circuit 41. Similarly, the sum output of sum and difference network 42 responsive to pick-offs 37, 37' is also supplied to control circuit 41. This circuit may include conventional signal averaging circuits or mid-value selection circuits for providing a single signal proportional to the average or mid-value of the departure of rotor 11 from its axial stable position. The output of the control circuit which may be of the character described in the reference Sabnis patent, is applied to coils 67, 67' to provide the active stabilizing magnetic flux through a suitable power amplifier 43.

As is well known to those familiar with the art of torque feed back gyroscopic rate sensors, it is desired that the coupling between the housing and the rotor induce zero torque on the rotor upon relative tilt between the two, so that the only restoring torque supplied to the rotor is that due to the feed back torque, in which case that torque is a precise measure of the rate of change of such relative tilt and hence is a precise measure of the rate of rotation of the housing and of the craft on which it is strapped. If the torque is provided by an electric torque motor, the electric current supplied to the torque motor is also a measure of the rotation rate. Since the time constant of the torque feed back control loop can be made very short and the gain thereof very high, the actual movement of the housing relative to the rotor is exceedingly minute, about a few seconds of arc. As discussed in the copending Dohogne application, the desired zero restraint or stiffness of the housing-rotor coupling is obtainable with a magnetically suspended rotor by the proper dimensioning of the suspension elements and the effective magnetic gaps. In the FIG. 1 embodiment, the radial-to-axial stiffness constant is about 8, yielding an L/R ratio of about 2:1, as described. Hence, the mean effective axial span between the gaps 26, 26' is designated L, while the mean effective radius of those gaps is designated R. In operation, the housing 10 and stator elements 20, 20' may be subjected to a tilt angle $\theta$ relative to rotor 11. Such action will, of course, be the same about the Z axis by symmetry. It will be noted that as the upper right and lower left pole faces of the rotor move toward their corresponding adjacent fixed pole faces, and as the upper left and lower right pole faces move away from their fixed pole faces, an overturning magnetic torque about axis Y is created by the axial passive or permanent magnet flux, which torque increases as the poles approach each other. However, it will also be noted that due to the same rotation, all of pole faces of the rotor are radially displaced from their corresponding fixed pole faces, developing a counter magnetic torque about the axis Y. The predetermined L/R ratio, as defined in the Dohogne application, results in the magnitudes of the two torques balancing each other. Without further tilting or restoring controls, rotor 11 remains where it is; that is, rotor 11 is neutrally suspended relative to housing 10. It will also be noted that since the mean axial position of the rotor has not changed, the active magnetic field is not generated. In practice, both the passive and active fields are produced; however, note that the active field is uniformly distributed across all gaps and will therefore not to any significant extent affect any unbalance of the angular overturning and restoring torques.

The torquing apparatus of the present invention for supplying the restoring precessional force on the rotor 11 required to cause it to follow any angular motion of the craft, and hence case 10, will now be described. While the torquing device of the present invention is being described in use with a force feed back rate sensor, it will be apparent that it is equally applicable in applying a force on the suspended member of any magnetic suspension system.

Figure 2A:
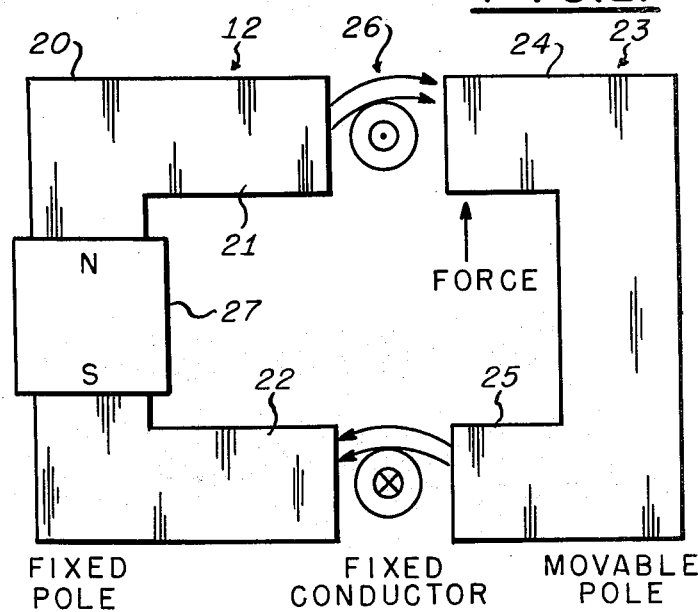
FIGS. 2A and 2B are partial schematic views of FIG. 1 elements useful in explaining the operation of the invention.

Basically, the novel torquer system makes use of magnetic fields already existing in the magnetic suspension. Referring to FIGS. 1, 2A, 2B, and 3, the unique torquer comprises at least one set of four coils 45, 46, 47 and 48, each coil comprising a flat, preferably single layer of very fine insulated wire so formed that the outer and inner arcuate sectors correspond generally in radius to the radii of pole faces 21 and 22, respectively. The arcuate extent of the coils may be as nearly ninety degrees as possible to maximize coupling with the suspension magnetic fields across the gaps. Coils 45 and 46 are secured, as by cementing to fixed pole faces 21 and 22 and are located so that they are bisected by the X-Z plane, while coils 47 and 48 (not shown in FIG. 1) are mounted on pole faces 21, 22 so that they are bisected by the X-Y plane. Coils 45 and 46 are electrically connected in series as shown in FIGS. 2A and 3 and may be referred to as the Y-axis torquer coils, while coils 47 and 48 are similarly connected and may be referred to as the Z axis torquer coils. In practice, companion coils are provided in both magnetic gaps with excitation polarities such that the resultant torques on the rotor 11 add.

Figure 2B:
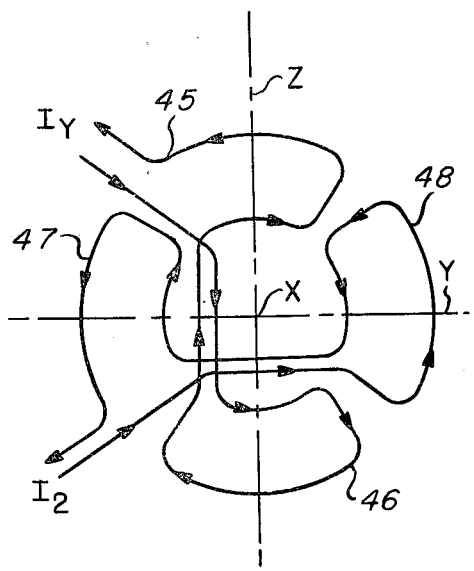

The torquer operation is as follows, reference being made primarily to FIGS. 2A and 2B. Assume that the permanent magnetic flux circulates clockwise from the north pole of magnet 27, out of pole face 21, across upper gap 26 through upper pole face of keeper 23, out of lower pole face of keeper 23, back across lower gap 26, into lower pole face 22, and so back to the south pole of magnet 27. Thus, the upper portion of coil 45 lies in a magnetic field extending to the right across upper gap 26 and the lower portion of coil 26 lies in a magnetic field extending to the left across lower gap 26. Now, assume a current is applied to the coil 45 coinciding in a sense that it flows through the upper coil portion toward the viewer and through the lower coil portion away from the viewer. The magnetic field produced by this current flow through the coil portions interacts with the permanent magnetic fields, polarized as shown in FIG. 2A, in the upper and lower gap 26 between poles 21, 22, effectively to distort these fields downward as viewed in the figure. Therefore, the upper and lower poles of rotor keeper 23 tend to align themselves with the distorted field and, in doing so, produce a force or torque counter-clockwise on rotor 11 about the Y-axis. The magnitude of this torque in one gap pair is $F = 0.5$ BLI, where B is the flux density, L is the length of the conductor in the field, and I is the current. The companion lower coil 46 provides a like torquer force on lower rotor keeper 24 about the Y-axis which will be in the same direction as that on upper keeper 23; the two torques will add or augment each other to produce a resultant counter clockwise torque about the Y-axis. Reversing the coil current will, of course, operate to produce a clockwise torque about the Y-axis. The Z-axis torquer coils 47, 48 operate in the same manner to produce reversible torques about the Z-axis.

In describing the operation of the sensor embodiment of FIGS. 1, 2A, 2B, and 3, assume the sensor is strapped to the aircraft so that its spin axis X—X is parallel with the aircraft fore-aft axis and the craft rotates about its yaw axis and hence sensor case 10 rotates about its Z-axis. Initially, rotor 11, through its gyroscopic inertia, tends to hold its position in space and the relative positions of rotor and case will be as shown in FIG. 1, although the axes X and Z will be interchanged (the angle $\theta$ will, of course, never be allowed to become as great as illustrated). This motion will generate a signal from proximeters 37, 37' of FIG. 3 which is applied to sum difference network 42 and the difference output thereof is applied to torquer control 50, which may be of the pulse-width type described in co-pending U.S. application Ser. No. 939,306, now U.S. Pat. No. 4,220,270 filed Sept. 5, 1978 in the name of A. R. Allen and assigned to the Sperry Corporation. The output of torquer control 50 is a control current proportional to the pick off signals which is supplied to Y-axis torquer coils 47, 48 to produce a torque about the Y-axis which, through gyroscopic precession, results in a rotation of the gyro about the Z-axis in a sense to reduce pick off signals to zero. If the craft continues to rotate about its Z-axis, a continuous current will be supplied to the torquers to keep precessing the gyro so that it keeps up with such turning. Thus, the current supplied to the torquer or the control signal producing such current is proportional to the rate at which the craft is turning about the Z-axis. Such an output is available at output lead 50'. The operation will be identical for turns about the Y-axis or any component of turn about both axes. Such feed back currents precisely represent the craft rate of turn because no other torques are being applied to the gyro due to the non-contacting, neutral or zero stiffness characteristic of the magnetic suspension. It should be noted that in many strapped down systems the gyro spin axes are skewed relative to the aircraft axes to provide redundancy as taught in M. S. Klemes and D. H. Duncan U.S. patent application Ser. No. 907,228, now U.S. Pat. No. 4,212,413 filed May 18, 1978 for a "Strapped Down Attitude and Heading Reference System for Aircraft Employing Skewed Axis 2-Degree-of-Freedom Rotor Gyro," assigned to Sperry.

Figure 4:
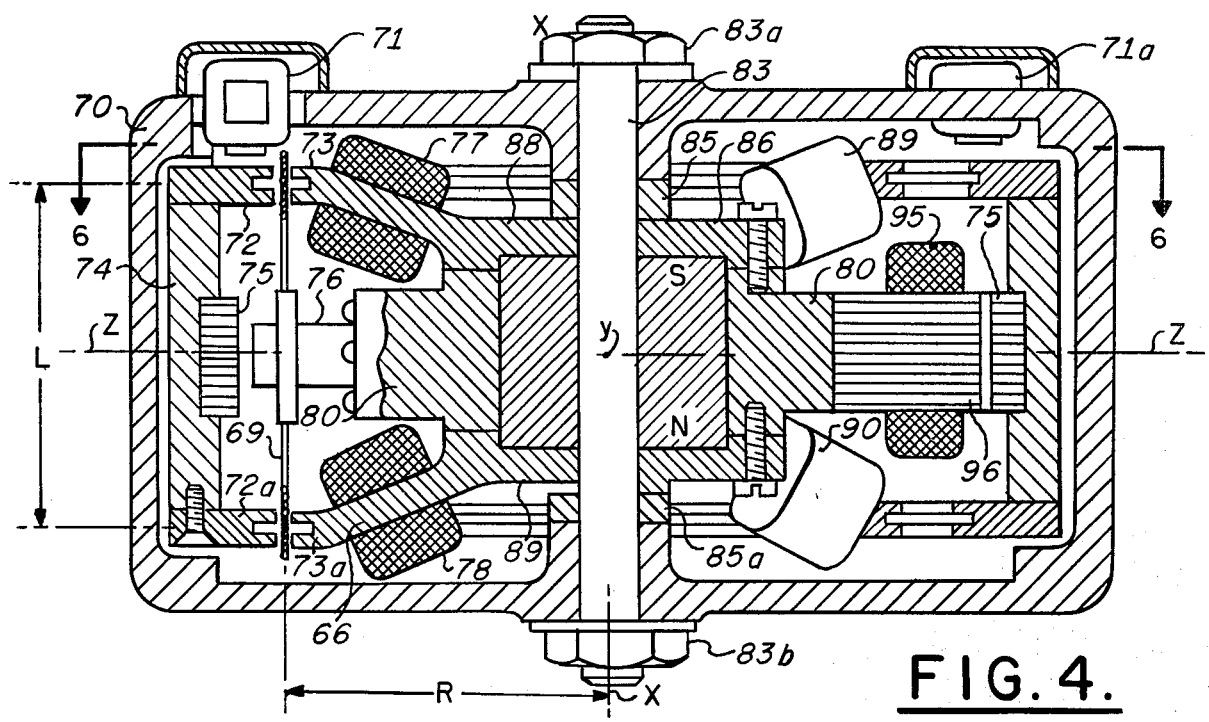
FIG. 4 is a cross section view of a radially active, axially passive embodiment of a rate sensor incorporating the invention and taken along the intersecting planes 4—4 of FIG. 5.
Figure 5:
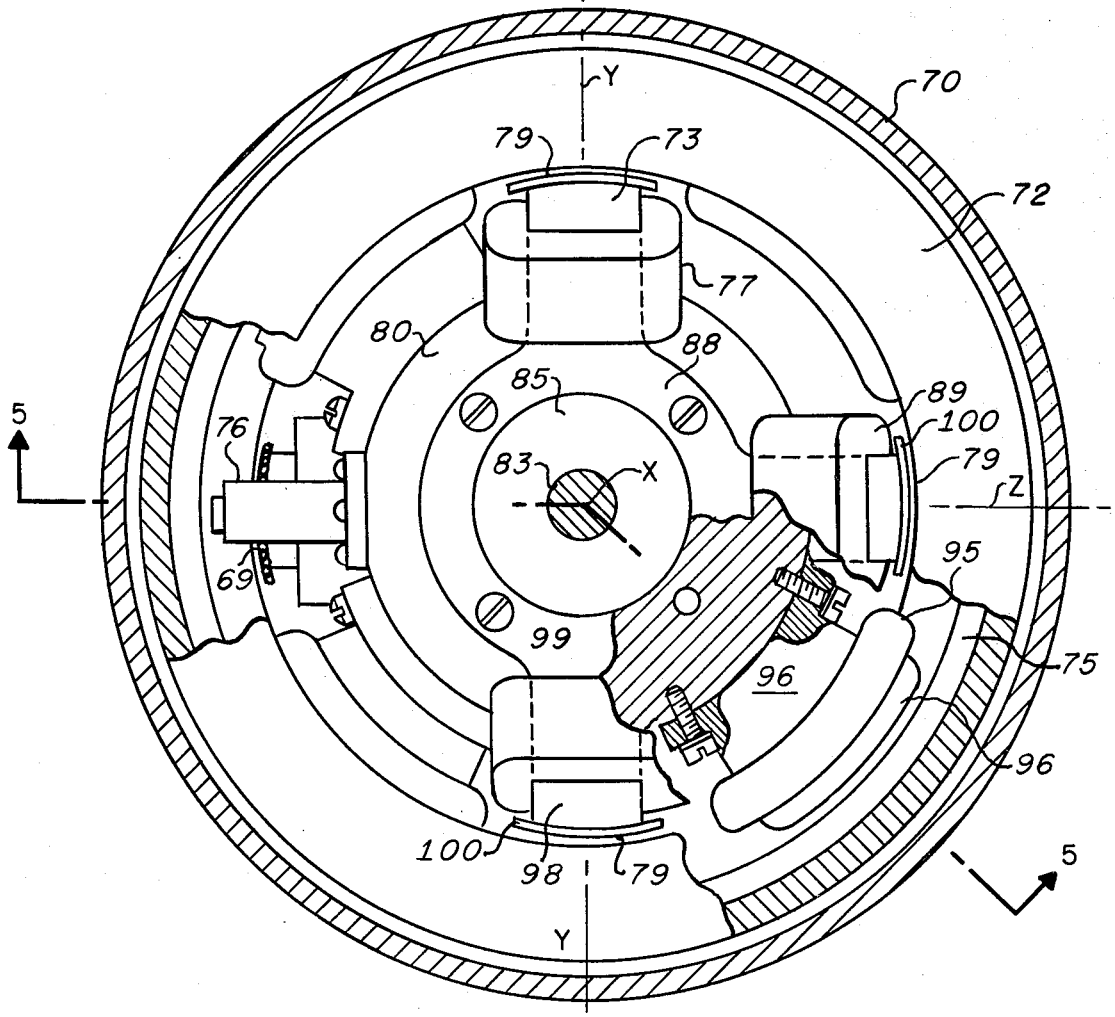
FIG. 5 is an elevation view partially in cross section and taken along the line 5—5 of FIG. 4.

It is to be observed that the torquer of the present invention may be employed in rate gyroscopes using radially active, axially passive magnetic suspension of the general type disclosed in the above referenced Studer patent. This modification of the present invention will be discussed in connection with FIGS. 4 through 7. The generally symmetric instrument components are similarly supported in a hollow cylindrical casing 70 having a central shaft of tie-rod 83 affixed generally along its axis of symmetry by suitable fasteners 83a, 83b, upon which shaft 83 substantially all of the fixed elements of the sensor are supported. The rotor drive motor comprises a plurality of conventional segmented stator members 96 and stator coils 95 affixed directly to an apertured spider element 80 as seen in FIGS. 4 and 5. The central opening of spider element 80 accommodates an annular hollow cylindrical magnet 86, polarized as shown for providing the passive rotor suspension magnetic flux. Magnet 86 fits closely over shaft 83 and is clamped thereon and between magnetically permeable spider elements 88, 89 of mirror image configuration. The spiders supporting magnet 86 are so dimensioned that a sufficient but minimum clamping load is placed on the fragile samarium cobalt magnet. Thus, elements 95, 96, 80, 86, 88, and 89 form integrated parts of the stationary portion of the instrument. Spacers or shims 85 may be provided to assure proper spacing of these elements.

The central spider element 80 also serves to support quadradically opposed, radially extending proximity pick offs such as pick off 76 that senses any radial motion of rotor 75. A second set of redundant pick offs may be disposed at right angles to the axis of pick off 76. These pairs of pick offs sense any radial motion of the instrument rotor along the X and Y axes and correspond to pick offs 36, 37 of the embodiment of FIG. 1 in their function of detecting axial motion of rotor 11.

Upper and lower spiders 88 and 89 include diametrically disposed radial arms 73 aligned with the Y-Z axis and form the fixed orthogonal magnetic poles for the magnetic suspension. On each arm of the upper spider element 88 there is supported, one of four coils such as coils 77, 89, two other such coils being located on the ninety degree spaced, radial arms; these coils providing the active radial stabilizing flux for the rotor suspension. Likewise, on the lower spider element 89, similar coils 78, 90 are provided. Thus, in place of the continuous annular stator magnetic suspension pole systems of FIG. 1, the instrument of FIGS. 4 and 5 uses four equiangularly disposed arcuate pole pieces. Such a configuration is entirely equivalent in operation to that of the annular ring bearing system of FIG. 2 and, as stated, is generally similar in operation to the magnetic support systems of the aforementioned Studer patent.

The rotor of the instrument includes a hollow cylinder 74 of magnetically permeable material which represents the major part of the rotor inertia. The inner surface of cylinder 74 is arranged to support the laminated rotor drive motor element 75. At the flat ends of cylinder 74 are affixed a pair of ring-shaped magnetic pole elements 72, 72a having ridged pole faces again for flux concentration purposes, each facing and cooperating with the matching ridged pole faces 73, 73a of the stator spiders to form magnetic suspension magnetic flux gaps 79. Again, in accordance with the present invention, the mean effective distance or span L between magnetic circuit gaps 79, bears the characteristic ratio to R, the mean effective radius of the gaps 79 with respect to the rotor spin axis X. The dimension L may be readily designed so that the ratio L/R can always be predetermined for which angular stiffness to rotor rotation about axis Y and Z is zero; that is, $K_\alpha = 0$, or substantially zero.

While in FIG. 1, the pick offs 36-37' serve the dual function of detecting both axial and angular motion of rotor 22, in the embodiments of FIGS. 4 and 5, separate pick offs are used for each function. As stated, the proximeter 76 provides the initiating signal for the magnetic suspension servo loop, whereas separate pick offs are used for the angular or torque feed back control loops. Thus, conventional inductive tilt pick offs 71, 71a are diametrically disposed in the X-Z plane, being suitably supported on housing 7, for detecting angular deflection of the rotor 74 about the Y-axis. The Z-axis tilt pick offs are the same and are similarly mounted on the housing to detect angular deflection of the rotor about the Z-axis. Thus, transducers are supplied in the second embodiment of the invention for use as the initiating signals for the torque feedback servo loop. Circuits similar to those of FIG. 3 may be employed and a detailed illustration and discussion thereof is not deemed necessary since they are readily understood by those skilled in this art.

Figure 7:
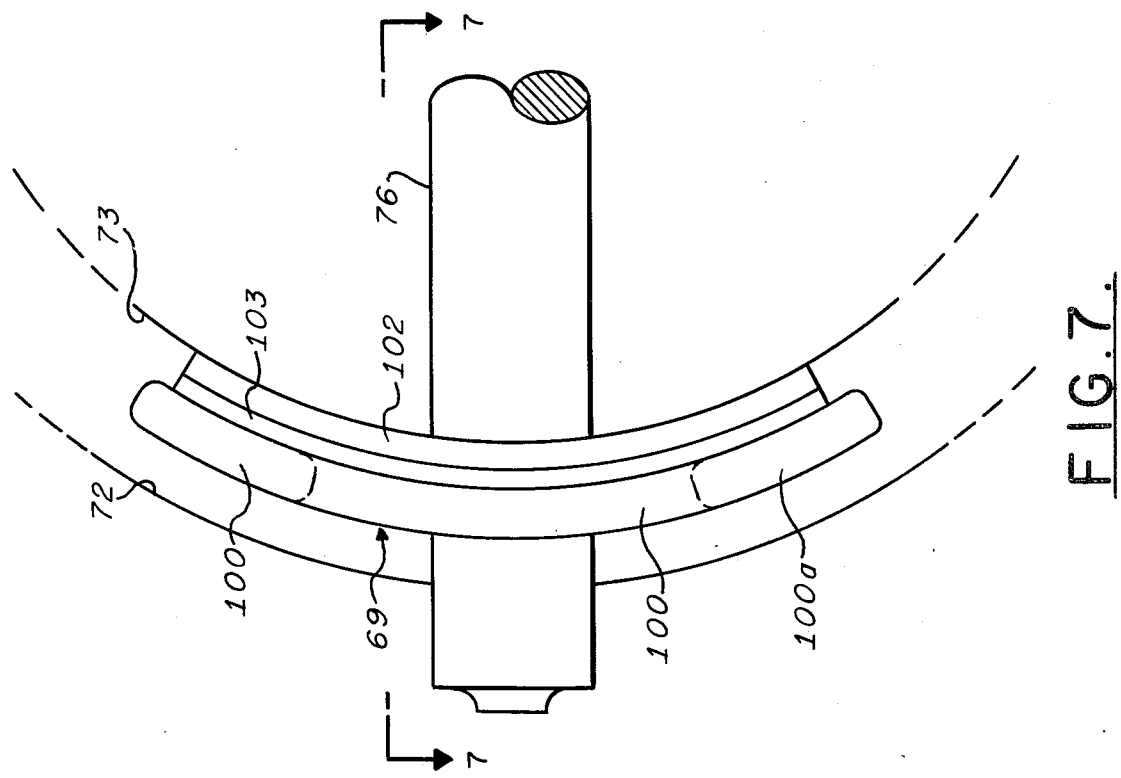
FIG. 7 is an elevation view of the same torquer device taken along the lines 7—7 of FIG. 6.
Figure 6:
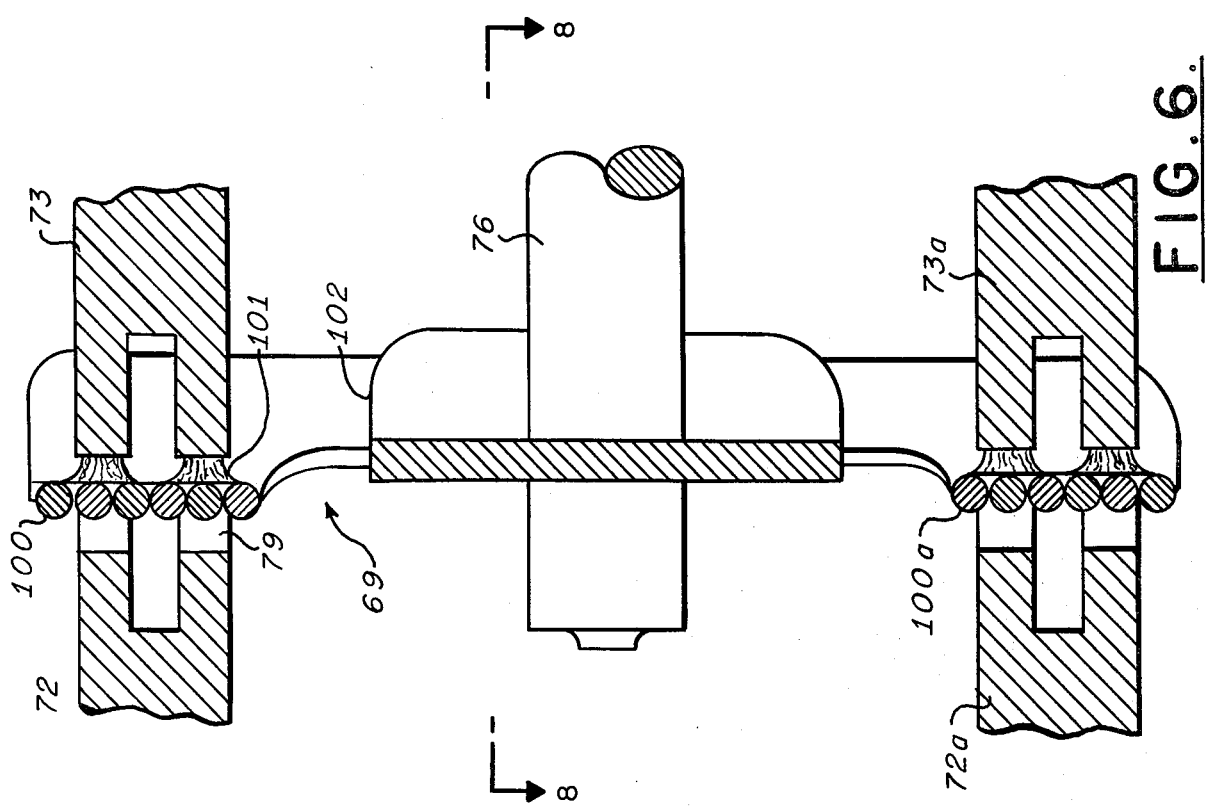
FIG. 6 is a detailed view, partly in cross section, of the torquer device of the present invention as employed in FIGS. 4 and 5, taken along the line 6—6 of FIG. 7.

The torquer of the present invention may be suitably modified and used in the embodiment of FIGS. 4 and 5. As in FIG. 1, arcuate coils 100 of FIGS. 4 and 5 are located in thin cylindrical magnetic circuit gaps 79 between stator pole piece 73 and rotor poles 72, for example. As shown in more detail in FIGS. 6 and 7, it will be noted that each torquer coil winding is preferably one wire thick and is generally rectangular in shape. Two such coils are required, one for each axis, but preferably four such torquer coils are employed for increased gain. One of these, such as coil 69, is shown in FIGS. 6 and 7 for applying a torque to rotor 74 about the Y-axis. Another or second diametrically opposite pair, spaced ninety angular degrees from the first pair, is provided for torquing the rotor about its Z-axis. Each torquer coil is constructed similarly to the coil 69 of FIGS. 6 and 7. Coil 69 is supported on a suitable arcuate mount 102 fixed to the radially extending proximity pick off 76. Curvature of coil 69 and its support mount 102 matches that of spider pole piece 73 so that coil 69 may be readily affixed to the support mount 102 and pole face by a suitable adhesive 101. In this manner, each of the four proximity pick offs serves its primary function while cooperating in the support of an associated torquer coil. Again, companion torquer coils will normally be provided in the opposed magnetic gap.

The operation of the torquer of FIGS. 6 and 7 is generally the same as that of FIG. 1. The difference is that, in FIG. 1, two serially connected torquer coils are used, one for the upper pair of poles and one for the lower pair of poles. Since in the embodiment of FIGS. 4 and 5 there are only two poles per torquer axis, only one coil is required. Upon tilt of the casing 70 relative to rotor 74, such tilt is detected by the angle pick offs 71, 71a, which signals are processed and amplified as in FIG. 3 so that a proportional current is applied to coil 69, for example. As in FIG. 1, the magnetic flux field about the upper and lower coil portions produced by this current reacts with the magnetic suspension magnetic flux field across gap 79 to distort the latter upward or downward, as viewed in FIGS. 6 and 7, so that the rotor poles, in attempting to follow this distorted field, generate a torque on rotor 74 about the Y axis proportional to the current flowing through the coil.

While the invention has been described in its preferred embodiments, it is to be understood that the words which have been used are words of description rather than of limitation and that changes may be made within the purview of the appended claims without departing from the true scope and spirit of the invention in its broader aspects.

I claim:

1. In a magnetic suspension system of the type including a fixed member and a movable member adapted to be suspended relative to said fixed member with three degrees of rectilinear freedom and three degrees of angular freedom, at least one of said members having a plurality of spaced magnetically permeable pole pieces and the other thereof having cooperable magnetically permeable pole faces defining a plurality of magnetically permeable gaps therebetween, each of said spaced plurality of pole pieces further including permanent magnet means for producing a fixed magnetic field across said gaps and variably energized coil means associated with said permanent magnet means for modulating said permanent magnet flux field in said gaps for suspending said movable member relative to said fixed member in a predetermined rectilinear positional relationship in the direction of said flux field, and means responsive to said flux field for normally maintaining said movable member relative to said fixed member in a predetermined rectilinear positional relationship normal to the direction of said flux field, the improvement for applying an electronically generated force on said movable member for controlling the angular positional relationship between said fixed and movable members comprising:

electric coil means mounted on at least one of said pole pieces and within its associated gap and having the conductors thereof oriented at right angles to said magnetic flux field in said gap, and control means for supplying an electric current through said coil means for changing the direction of said modulated magnetic flux field across said gap whereby to induce a force on said movable member normal to said flux field proportional to said current.

2. Apparatus as set forth in claim 1 wherein said effective portion of said electrical coil means is mounted on said fixed member.

3. Apparatus as set forth in claim 1 wherein each of said cooperating pole faces comprise a pair of pole faces defining a pair of magnetic gaps, wherein said modulated magnetic field is produced in opposite directions across each gap of said pair of gaps, wherein said electrical coil means is mounted on both pole faces and having opposed portions thereof oriented at right angles to said magnetic flux fields in said gaps, whereby substantially to increase the total force on said movable member.

4. The magnetic suspension system as set forth in any one of claims 2, 3, and 1 wherein said movable member is a gyroscopic rotor and wherein said control means comprises pick-off means coupled between said fixed member and said movable member for detecting changes in said predetermined positional relationship normal to said flux field, and means responsive to said pick-off means for supplying a torque on said movable member in a sense to reduce said detected changes to zero.

5. A free rotor gyroscopic rate sensor comprising:
housing means having a housing axis,
generally cylindrically rotor means adapted to spin about a spin axis in said housing normally coincident with said housing axis,
magnetic suspension means coupled between said housing means and said rotor means for contactlessly suspending said rotor means in said housing means with said rotor axis normally coincident with said housing axis, said magnetic suspension means comprising,
at least one pair of axially spaced magnetic flux gaps formed by at least one pair of magnetically permeable pole pieces on said housing means radially spaced from said spin axis and a cooperating pair of corresponding axially and radially spaced pole pieces on said rotor means, and
means for producing passive and active magnetic fluxes between said pole pieces, said active and passive magnetic fluxes supporting said rotor means in unstable equilibrium in a first direction relative to said spin axis and said passive magnetic flux supporting said rotor means in stable equilibrium in a second direction relative to said spin axis at right angles to said first direction,
motive means coupled between said housing and rotor means for spinning said rotor means about said spin axis,
the mean axial distance between said axially spaced gaps bearing a predetermined ratio to the mean radius of said spaced gaps, such that in response to relative tilting of said rotor spin axis and said housing means, the passive magnetic flux force tending to retain said rotor means in stable equilibrium in said second direction is substantially balanced by the passive magnetic flux force tending to destabilize said unstable equilibrium in said first direction,
pick-off means for sensing and providing a signal proportional to said relative tilt,
electric coil means mounted on at least one of said pole pieces and in said magnetic flux gap and having the conductors thereof oriented at right angles to said flux field in said gap, and control means responsive to said pick-off signal for supplying an electric current through said coil means for changing the effective direction of said magnetic flux field across said gap whereby to induce a torque on said rotor means in a sense to reduce said pick-off signal to zero.

* * * * *